United States Patent [19]
Chamberlin

[11] 3,853,394
[45] Dec. 10, 1974

[54] VIDEO FILM PROJECTOR

[76] Inventor: Earl Chamberlin, 1804 Mission, Santa Cruz, Calif. 95060

[22] Filed: June 6, 1973

[21] Appl. No.: 367,641

[52] U.S. Cl. ............................. 352/184, 352/128
[51] Int. Cl. .............................................. G03b 1/00
[58] Field of Search .................... 352/184, 128, 187

[56] References Cited
UNITED STATES PATENTS

| | | | |
|---|---|---|---|
| 1,244,920 | 10/1917 | Thomas | 352/184 X |
| 1,604,389 | 10/1926 | Cohn | 352/128 |
| 1,874,908 | 8/1932 | Craig | 352/184 |
| 2,279,022 | 4/1942 | Duskes | 352/128 |
| 2,953,965 | 9/1960 | Stiffler | 352/184 X |
| 2,962,928 | 12/1960 | Fuller | 352/72 |
| 3,247,126 | 4/1966 | Palmer | 352/184 |

Primary Examiner—Monroe H. Hayes
Attorney, Agent, or Firm—Phillips, Moore, Weissenberger, Lempio & Strabala

[57] ABSTRACT

A pin registration film projector includes a rotatable shutter synchronized with film transport by means of a member operable by the rotating shutter to disengage film from the registration pin for transport. A snubber pin prevents undue tension of the film as it exits from the gate.

A loose, open loop cartridge is provided with a gate and a pair of pinch rollers for driving both loops of film in cooperation with a capstan drive on the projector frame.

A drive mechanism includes a series of pulleys driving a rachet and film sprocket wheel and a pawl engageable with the rachet and operable by a cam to release the rachet and sprocket for intermittent driving of the sprocket. The pawl is also equipped with a solenoid for actuation by electronic signals. A pulley drives the rachet and sprocket through belt means, and is pivotable to circumferentially engage the rachet and drive it in an opposite direction for rewinding of film.

A notch detector is provided and comprises a pawl pivotable upon detecting a notch in the film strip to engage the rachet and stop film advance for still frame projection. A disengageable timing mechanism for automatic resumption of film driving includes a worm, and a worm follower provided on the pawl for disengaging the pawl from the rachet after traversing the worm. Adjustment means is provided for adjusting the point of initial engagement of the worm by the worm follower to adjust the length of the timing cycle.

8 Claims, 5 Drawing Figures

3,853,394

VIDEO FILM PROJECTOR

BACKGROUND OF THE INVENTION

This invention relates to the field of motion picture projectors, and more particularly to projectors employing pin registration transport systems. In the past such projectors have not been provided with a shutter mechanism that is accurately synchronized with film transport.

Also, motion picture transport mechanisms utilizing a pin registration arrangement, often referred to as the "Edison Loop" system, have presented a number of problems in adapting them for high quality convenient home use systems.

Such systems have required a "closed loop" arrangement whereby a film strip is driven by a single sprocket both upstream and downstream of the gate. Thus to employ a cartridge type film supply with such mechanisms required provision of the driving sprocket in each cartridge, greatly increasing their cost. In addition, since the film must remain wound around the sprocket at all times, when the cartridge is not being used, the film will "set" in its stored configuration, resulting in distortion and skipping when next the film is run.

However, if such closed loop systems are not used, it is no longer possible to employ a loose loop cartridge, allowing reversible driving of the film, since the film is then driven only at one point.

Furthermore, the utility of such systems has been limited since they did not provide for variable speed and still frame operation.

SUMMARY OF THE INVENTION

It is an object of the present invention to provide an audio video film projector having a pin registration transport mechanism with an improved mechanism for synchronization of a shutter with transport of the film at any frame per second speed.

Another object of the present invention is to provide an audio video film projector having a transport mechanism and a positively synchronized shutter, and having a constant transport time, but a variable film frame per second speed.

Another object of the present invention is to provide a capstan drive for sound on film, without the usual problem of synchronizing capstan travel of film to transport travel of film.

Still another object of the present invention is to provide the capability for an inexpensive endless loop film cartridge that can be used with sound on film, and does not form a distortion or 'set' in the film.

It is also the object of the present invention to provide a simple and inexpensive means to control the frame per second speed without using a separate motor and speed control.

Another object is to provide mechanical means for a variable time delay automatic still frame viewing of motion picture film.

These and other objects and advantages are achieved by the present invention which provides an audio video film projector having a pin registration transport mechanism in which the projector includes a shutter comprising a circular segment which is rotatable to interrupt a light path in the aperture upon transport of film in the gate. A pivotable member which initiates film transport is rendered operable by the shutter mechanism only when the shutter blanks the light path in the aperture.

Film may be driven through the gate by either a capstan or sprocket. A loose loop film cartridge having a gate and a pair of pinch rollers may be used with the capstan drive.

A sprocket drive operable by a cam-driven or solenoid-driven pawl intermittently drives film into the gate. A pulley driving the sprocket is rotatably mounted on a pivotable plate whereby it may be pivoted into circumferential engagement with the sprocket for rewinding of the film.

A notch detecting pawl is spring biased against the edge of film in the projector whereby upon encountering a still frame code notch in the edge of the film it will pivot to engage a rachet driving the sprocket, to suspend film driving. A timing worm is engageable by a follower on the pawl upon pivoting of the pawl for automatic timing of the still frame delay. Continued driving of the worm by the projector drive mechanism will drive the follower along the worm until it reaches a conical end surface whereupon the conical surface will thrust the follower and pawl away from the worm, disengaging the pawl from the rachet to allow continued driving of film. The initial point of engagement of the worm by the follower is adjustable to provide for adjustable delay. The timing mechanism may be disengaged for indefinite delay.

DESCRIPTION OF THE PREFERRED EMBODIMENTS

Figure 1:
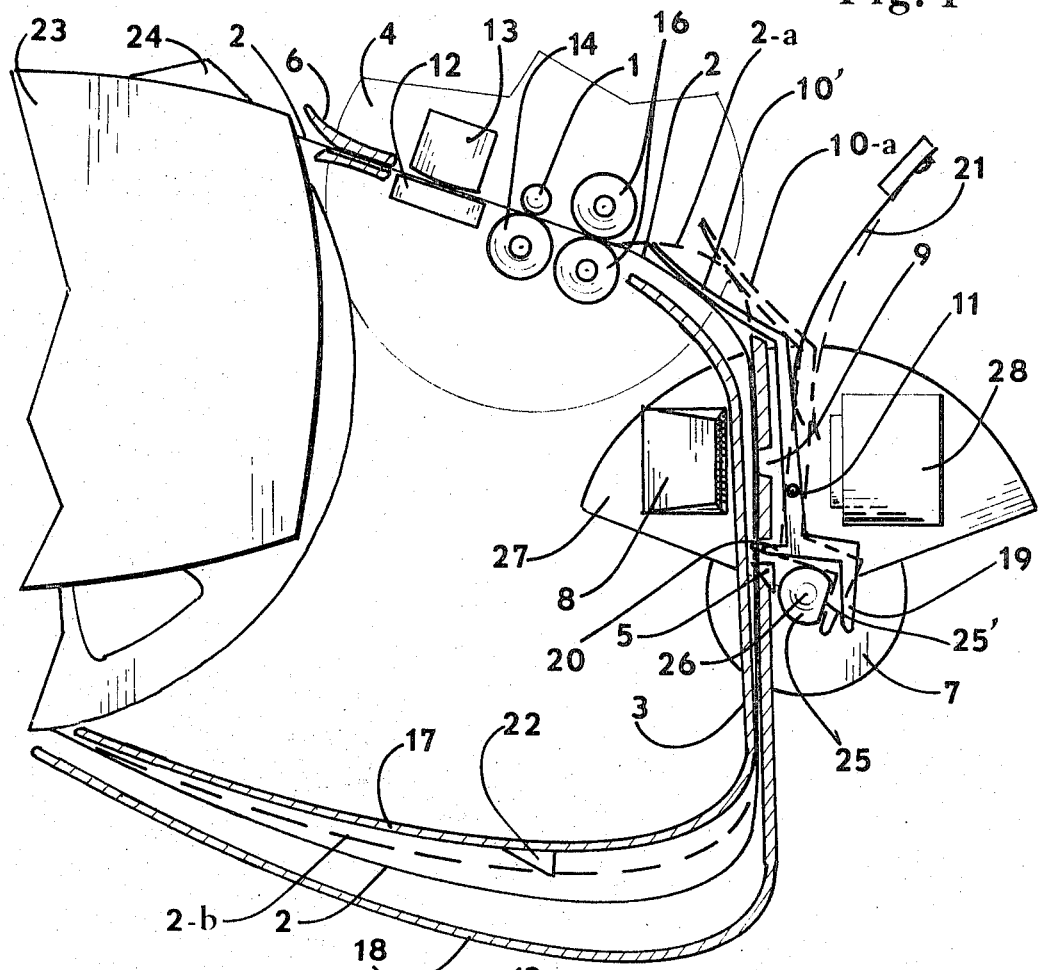
FIG. 1 is a schematic side view of one embodiment of the transport mechanism and shutter of the present invention.

Referring to FIG. 1, a combined pin registration transport and shutter mechanism constructed in accordance with the present invention is shown as comprising input film guides 6, a capstan drive 1 driven by a pulley 4, a gate 3 having an aperture 9 provided therein, a film registration pin 5 provided in the gate below the aperture, and exit guide members 17 and 18. A mirror 8 is arranged to receive light from a source not shown and direct it through aperture 9 and a lens 28.

A shutter member 27 is mounted on a rotatable shaft 26 to rotate past mirror 8 to interrupt light directed through aperture 9 and lens 28. Shaft 26 is driven by a pulley 7.

A film strip 2, fed from a supply reel 23, is shown entering the transport mechanism through input film guides 6, passing between a pressure pad 12 and an electronic sound pickup head 13, which picks up sound on the film in conventional manner, between a pinch roller 14 and a capstan drive 1, (driven by a motor not shown), then between two pinch rollers 16 to absorb shock in the film strip from intermittent transport, past a member 10 and down through gate 3, past aperture 9 and pin 5, exiting between guides 17 and 18.

Member 10 is pivotably mounted on a pin 11 and includes a first end 10' adapted to engage a film strip disposed in the projector between pinch rollers 16 and gate 3 and biased thereagainst by a spring clip 21, and a second, bifurcated end 10'' which includes a cam follower 19 adapted to engage a cam 25 attached to shaft 26, and a finger 20 disposed in the gate adjacent registration pin 5.

The film strip is driven through the projector by capstan 1. As the capstan drives the film strip, registration pin 5 will engage a perforation in the film and hold it stationary in the gate. Continued driving of the film by capstan 1 will then cause a 'bulging' of the film strip into a loop 2-a, which causes member 10 to rotate on pin 11 to the position shown in phantom at 10-a, against the force of spring clip 21. When member 10 pivots, cam follower 19 is thrust into engagement with rotating cam 25. Cam 25 limits the rotation of member 10 to prevent finger 26 from engaging film in the gate until cam follower 19 encounters a flat, 25' on cam 25, allowing finger 20 to move into film path and dislodge film from pin 5, whereupon natural film spring forces inherent in loop 2-a, combined with compression force of member 10 on the film strip produced by spring 21, drives the film strip down through the gate past aperture 9, until next perforation in the film catches on pin 5.

Flat 25' on cam 25 is so arranged with respect to shutter 27 that the flat will allow finger 20 to move in and unseat the film from pin 5 just after shutter 27 has interrupted the light path from mirror 8. Synchronization of the shutter with film transport is thus positive since the shutter directly triggers transport of the film strip in the gate.

As the film strip exits from the gate it forms a loop 2-b and then passes through exit guide members 17 and 18 to a take-up reel 24 driven in any conventional manner.

Exit guide member 17 has a pin 22 provided thereon adapted to engage perforations in the film strip as take-up reel 24 pulls loop 2-b up against guide member 17. Thus pin 22 prevents the take-up reel from exerting undue tension on film in the gate.

Figure 2:
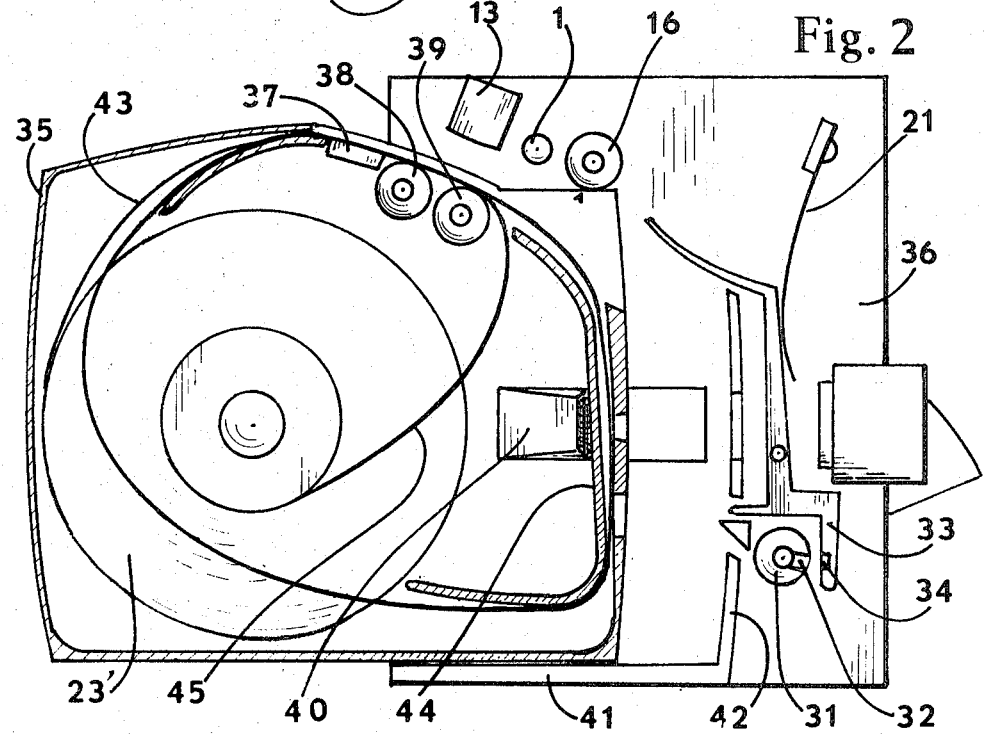
FIG. 2 is a schematic side view of another embodiment of the invention shown in FIG. 1.

FIG. 2 shows another embodiment of the present invention adapted for use with an endless loop film cartridge 35. Cam 25 is replaced with a drum 31, having a permanent magnet 32 embedded on one side thereof. Follower 33 includes a small bit of ferrous metal 34 whereby as follower 33 approaches drum 31 when member 10 pivots under the force exerted thereon by film loop 2-a, magnet 32 in rotating drum 31 attracts the metal bit 34 in follower 33, generating a series of tapping blows of finger 20 against the film strip adjacent pin 5, a final stroke unseating the film at precisely the time shutter 27 has interrupted light path to mirror 8.

In FIG. 2 an adaptation of the projector of FIG. 1 for use with an endless loop film cartridge is also shown. A film cartridge 35 contains a pressure pad 37, a pinch roller 38 and a pinch roller 39. A mirror 40 may also be located in the cartridge. The cartridge is inserted into the projector by sliding it along a guide 41 until it is stopped by a guide 42, thus positioning pick-up head 13, capstan drive 1 and pinch roller 38. Pin 5 and finger 20 are also properly located with respect to the cartridge.

The cartridge shown in FIG. 2 may be used as a loose loop cartridge, as well as a tight loop cartridge, to permit reversible driving of the film strip.

FIG. 2 shows a loose endless loop in the film cartridge. Film is drawn from outside loop 43 of supply reel 23' and over pressure pad 37, pinch rollers 38 and 39, down through gate 44 and back up to again pass over pinch rollers 38 and 39, and capstan 1. The film then loops down to re-enter supply coil 23'. Capstan 1 thus drives two contiguous loops of film, one down through the gate and one into center of supply reel.

This arrangement allows both forward and reverse movement in an endless loop film cartridge, as the two loops will travel an identical distance on a single capstan, and not lose their proper relationship.

It also avoids sharp bends in the film strip. Therefore, even if the cartridge is left in the projector for a period of time, the film will not be distorted by any sharp turns or twists and take a 'set.'

Figure 3:
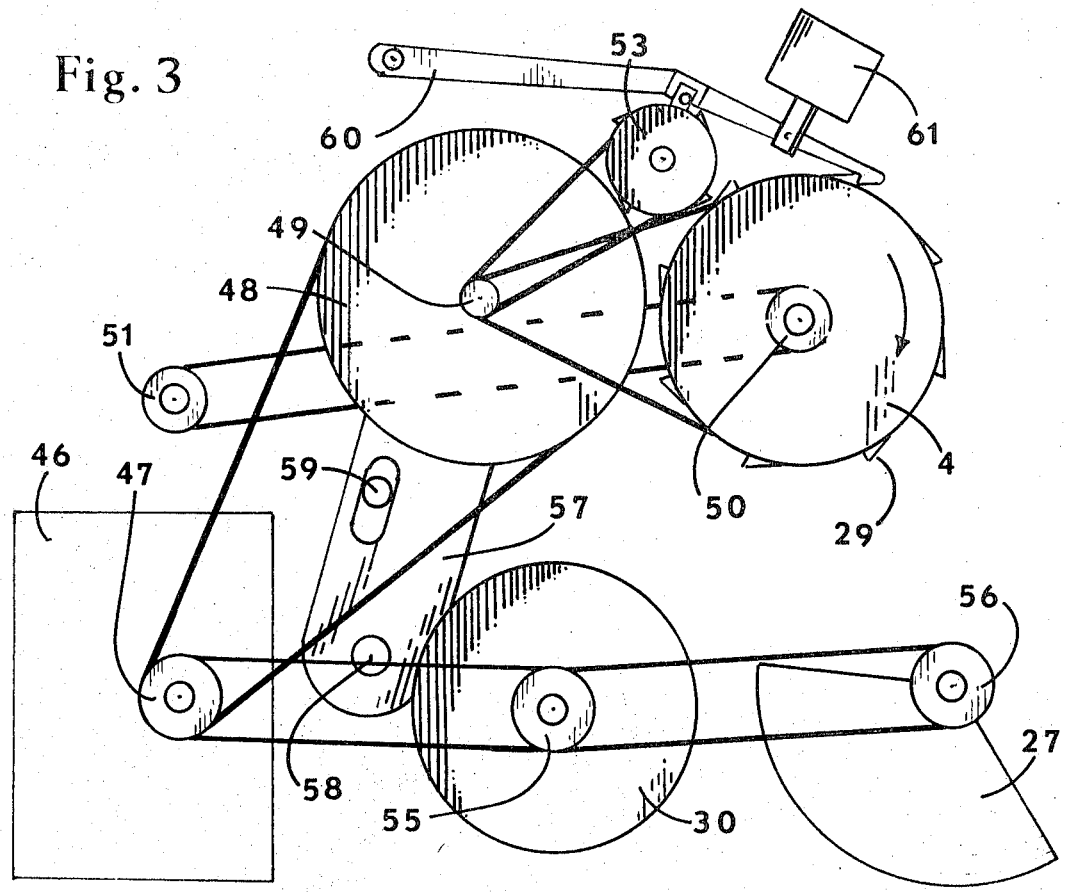
FIG. 3 is a schematic side view of a drive mechanism for the projector of the present invention.

FIG. 3 is a diagrammatic view of an improved drive system suitable for a projector like the one shown in FIG. 1. To allow for still frame capabilities, the sound head has been eliminated and a film sprocket has been substituted for the capstan.

A motor 46 includes a drive shaft having a double drive pulley 47 mounted thereon. A pulley 48 is rotatably mounted on a plate 57, which is pivotally mounted on the projector frame at 58, and has a smaller double pulley 49 mounted coaxially for rotation therewith. Pulley 48 is driven by a pulley 47, and pulley 49 in turn drives a pulley 4 having a series of rachet teeth 29 on the periphery thereof which are engageable by one end of a pawl 60 having its other end pivotally mounted on the projector frame. Intermediate the ends of the pawl is a cam follower portion 62 engaged by a multiple cam 53, in driven relationship with a pulley 52 which in turn is driven by pulley 49.

Pulley 4, through a common shaft 80, also drives a sprocket wheel 74 which drives film through the projector.

Engagement of rachet teeth 29 by pawl 60 will stop pulley 4 and sprocket 74 for intermittent driving of film by the sprocket wheel. The belt driving pulley 4 will merely slip on pulley 49 while pawl 60 engages a rachet tooth 29 on pulley 4.

Pawl 60 may also be controlled by a solenoid 61, energized by means of signals from an intervelometer, magnetic tape, or other source. Multiple cam 53 would be adjusted to a blank space during operation of the solenoid.

Pulley 47 also drives shutter 27 through a series of pulleys 55 and 56. Pulley 55 is arranged to drive an exhaust fan 30 for cooling the projector lamp, if needed.

Plate 57 has a slot provided therein engaged by an eccentric cam 59. Cam 59 may be rotated by pivot plate 57 whereby pulley 48 is thrust against pulley 15 which is coaxial with pulley 4, releasing tension in the belt driving pulley 4 and thus driving pulley 15 and sprocket 74 in a reverse direction for rewinding of film at a high speed.

Figure 4:
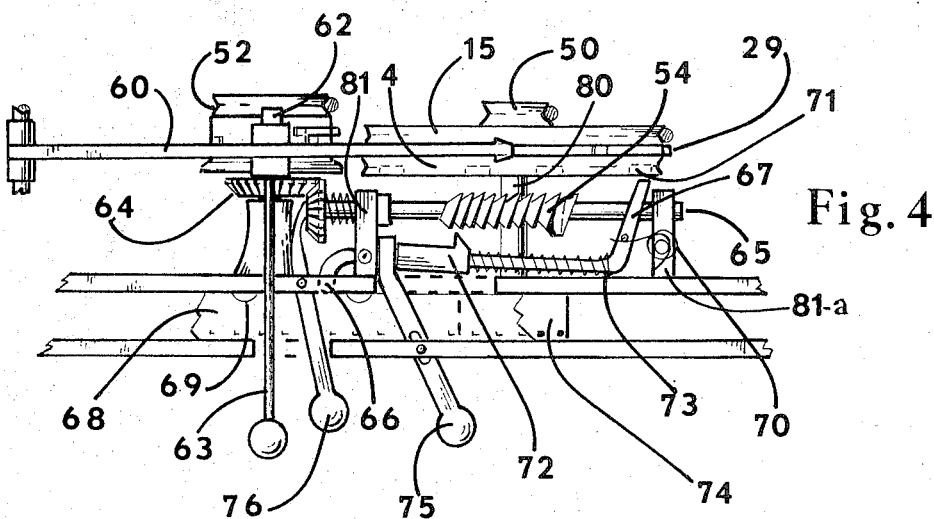
FIG. 4 is a top view of the speed control mechanism and time delay mechanism of the present invention.

FIG. 4 shows a top view of pulleys 15 and 4, cam 52, and sprocket 74 of FIG. 3 and the mechanism which provides for driving film at different frame-per-second speeds. Multiple cam 53 contains several rows of cam lobes each containing a different number of lobes. Follower 62 may be shifted by means of a rod 63 to select the proper number of cam lobes that will release pawl 60 for a given number of frame advances per second. Each rachet tooth is matched with a tooth on the film sprocket 74. Thus each advance of the pawl and rachet will advance film one frame.

Figure 5:
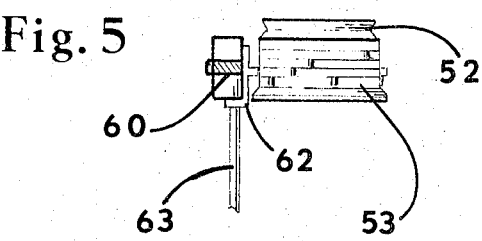
FIG. 5 is a top view of a part of the mechanism of FIG. 4.

FIG. 5 shows detail of cam 53 with cam lobes and cam follower 62.

FIG. 4 also shows a mechanism which provides for automatic timed still frame projection. Pulley 52 and cam 53 drive a pair of bevel gears 64 which in turn drive a shaft 65 mounted on frame bearing members 81 and 81a and carrying a worm 54 thereon which terminates in a conical end. A pawl 67 is pivotally mounted on a frame bearing member 81 and has a first end 66 arranged to ride on one edge of a film strip 68 driven by sprocket 74. Pawl 67 includes an intermediate portion arranged substantially parallel to shaft 65 and having a worm follower 72 slideably mounted thereon and biased toward end 66 by a compression spring 73. Pawl 67 also has a distal end adapted to engage notches 71 in the face of pulley 4. End 66 of pawl 67 is biased against the film strip 68 by a spring 70 whereby upon registration with a notch 69 in the edge of the film strip, end 66 will drop into the notch, allowing pawl 67 to pivot whereby the distal end will engage a notch 71 in pulley 4, stopping pulley 4, pulley 15 and sprocket 74. At the same time, the worm follower will engage worm 54. Thereupon continued driving of pulley 52 and shaft 65 will pull worm follower 72 along the worm until it reaches the conical end thereof, whereupon the follower will be forced away from the worm, causing pawl 67 to pivot against spring 70, withdrawing end 66 from notch 69 and the distal end from notch 71. Pulley 4 and sprocket 74 will then again drive film strip 68. The edge of the film strip will then again retain pawl 67 in its original position, allowing spring 73 to return worm follower 72 to its original position. An adjusting lever 75 can adjust the position of follower 72 with respect to worm 54 to vary the delay time.

The delay mechanism may be disabled by means of a lever 76 which is pivotable to disengage bevel gears 64 by sliding shaft 65 axially through frame mounting and bearing members 81 and 81a against a concentric compression spring 73.

While preferred embodiments of the invention have been illustrated and described, it should be understood that the invention is not intended to be limited to these embodiments, but rather is defined by the accompanying claims.

What is claimed is:

1. A film projector comprising a gate, means forming an aperture in the gate, means having a light path through the aperture, drive means for driving a film strip through the gate, registration pin means for engaging perforations in a film strip driven through the gate to hold the strip motionless with respect to the aperture, shutter means for interdicting the light path, and synchronizing means movable in response to rotation of said shutter member through the light path to engage the film strip in the gate and disengage it from the registration pin for positively synchronizing the shutter means with transport of the film strip past the aperture, wherein said shutter means comprises a shutter member mounted on a rotating shaft for rotation through said light path, and wherein said synchronizing means comprises a cam mounted on said shaft for rotation therewith, and a cam follower member pivotally mounted on the projector frame, and having a finger arranged to intermittently engage a film strip in the gate adjacent the registration pin and disengage it from the registration pin as the cam rotates, said cam follower member further comprising a distal end adapted to engage a film strip in the projector upstream of the gate and spring means for biasing said distal end against a film strip in the projector whereby film upstream of the gate will inherently bias the follower against the cam end and, upon disengagement of the film strip from the registration pin, the follower will urge the film strip through the gate under the force of said spring means.

2. The film projector defined in claim 1 wherein said cam and said follower are provided with magnetic means whereby the cam will intermittently attract the follower member, pivoting the follower member to move the finger to disengage a film strip in the gate from the registration pin.

3. The projector defined in claim 1 further comprising spaced exit guide means downstream of the gate for receiving film as it exits from the gate and directing it toward a take-up reel, and wherein said exit guide means includes a snubber pin for engaging the film when the take-up reel takes up slack in the film downstream of the gate to prevent the take-up reel from pulling film out of the gate.

4. The projector defined in claim 1 wherein said drive means comprises a capstan, and pinch roller means in cooperative engagement with the capstan for driving a film strip therebetween, and wherein said capstan and pinch roller means are adapted for simultaneous driving of both loops of a loose, endless loop of film.

5. The projector mechanism of claim 1 wherein said drive means comprises, a rachet wheel, a sprocket wheel driven by the rachet wheel, belt drive means for driving the rachet wheel, a pawl arranged to engage the rachet wheel, and means to intermittently disengage the pawl from the rachet wheel for intermittent driving of the rachet wheel and the sprocket wheel.

6. The construction defined in claim 5 wherein said means for intermittently disengaging the pawl from the rachet wheel comprises a solenoid having its armature connected to the pawl and operable in response to electronic frame advance signals.

7. The construction defined in claim 5 wherein said means for intermittently disengaging the pawl from the rachet wheel comprises, cam means driven by the belt drive means, and cam follower means provided on the pawl and engageable by the cam means for pivoting of the pawl upon rotation of the cam to intermittently disengage it from the rachet wheel.

8. The combination of claim 7 wherein said cam means comprises a drum having a plurality of cam lobes provided thereon and engaged in circumferential rows wherein there is a different member of equidistantly spaced cam lobes in each row, and wherein the cam follower means is axially adjustable on the pawl with respect to the drum for engagement with a selected row of cam lobes whereby the sprocket wheel may be driven at different frame-per-second speeds.

* * * * *